Patented Feb. 8, 1944

2,341,055

UNITED STATES PATENT OFFICE 2,341,055

RUBBER COMPOUND

David Pelton Moore, Avon Park, Fla., assignor to X-L Chemicals, Incorporated, a corporation of New York No Drawing. Application April 22, 1940,
Serial No. 330,990

2 Claims. (Cl. 260—815)

The present invention relates to improvements in rubber compounds, and relates more particularly to compounds employing ammoniated and de-ammoniated rubber latex or aqueous dispersions of rubber, one object of the invention being the provision of a compound in which the rubber in the latex is held uncoagulated yet vulcanized, so that shortly after exposure to the air at normal temperatures it congeals and presents a substantially non-tacky or nearly non-tacky vulcanized rubber.

Several formulas have been discovered that will accomplish this, and they will be given herein.

As for instance:

Formula No. 1, consists of

|  | Per cent |
|---|---|
| Latex of 60–63% solid | 40 to 80 |
| Sodium bisulphite | 2 to 5 |
| Sodium perborate | 2 to 5 |

Formula No. 2, consists of

| Latex of 60–63% solid | 40 to 80 |
|---|---|
| Sodium bisulphite | 2 to 5 |
| Sodium bi-carbonate | 2 to 5 |

Formula No. 3, consists of

| Latex of 60–63% solid | 40 to 80 |
|---|---|
| Sodium bisulphite | 2 to 5 |
| Sodium carbonate | 2 to 5 |

In mixing either of the above formulas the sodium elements are separately dissolved in as little water as will accomplish complete combined solution, and this solution is then added to the latex and stirred slowly.

The resultant will congeal when spread and exposed to the air, and will act as a vehicle for certain antiseptics such as mercuro-chrome, iodine, arnica, belladona, capsicum, belladona-capsicum, menthol, camphor and certain medical ingredients that are soluble or slightly soluble in water. These ingredients may form from 1% to 20% of the mixture, according to the purpose for which it is intended.

It is also possible to add casein glue to this latex mixture to provide an adhesive for paper, fabrics, carpet and rug backings and the like, and the amount of the casein glue paste which should be about the consistency of a stiff buckwheat batter is about 10 to 30% of the mixture.

Mixture No. 1 is a very desirable non-tacky adhesive; while No. 2 is more tacky, but can be made non-tacky by dusting with talc powder when congealed, while mixture No. 3 is less tacky than No. 2, but not so good as No. 1.

The sodium bisulphite when used alone will cause the latex to coagulate, and therefore it needs a retarder of vulcanization or coagulation, and the sodium perborate, sodium bicarbonate and/or the sodium carbonate act as such. These may be mixed together, such as a mixture of sodium perborate and sodium bicarbonate; sodium perborate and sodium carbonate; or sodium perborate, sodium bicarbonate and sodium carbonate; and the proportions thereof as relates to the other may be varied, but the sodium bisulphite forms herein the coagulant or cold vulcanizing agent.

Regardless of the percentage of sodium sulphite that may be added to latex, whether the latex be what is known as fresh or stale, within thirty minutes after the addition, there is produced undissolvable rubber, which will form a ball or mass in the liquid, so therefore the sodium sulphite must never be added to latex unless the latex contains therein or there is mixed with the sodium bisulphite, a retarder or an arrester of coagulation. Therefore if sodium bisulphite and water is added to latex, and latex containing sodium perborate is afterward or immediately added to the sodium bisulphite treated latex, the coagulated sulphited latex or rubber will result, and there will not be an evenly flowable latex compound, as in the case where the latex carries the perborate and the sodium bisulphite is added, or the two sodiums are mixed in water and then added to the latex, as in the present instance.

The sodium bisulphite has two uses in the present compound, for in addition to acting as a coagulant for the rubber solid of the latex, it supplies sulphur to assist in the vulcanizing, but it must have a retarding agent combined with it, in order that the latex compound will remain liquid and ready for use when in a sealed container.

Any of the above mixtures when sprayed, poured or spread by a roller or doctor's knife will form a vulcanized surface or adhesive at normal temperature, as for instance from 40° to 180° Fahr., the latter when heat is used to accelerate drying and congealing.

To add toughness to the coagulated rubber and also to reduce the tackiness thereof, to each of the above formulas is added a solution of potassium permanganate, ranging from 6 to 50 grains of potassium permanganate to 100 cc. of water. The amount of the solution is from 2 to 20% of the adhesive.

When plaster of Paris is used with any of the above examples, it has been found advisable to mix it with a water solution of sodium perborate and/or sodium bisulphite before intermixing with the adhesive. The proportions will vary in accordance with the amount desired in the final paste, but it can be made from 10% of the bulk to 40% of the bulk. Should it be desirable after once adding some of this mixture to the adhesive to add more plaster of Paris, the same must be mixed with a water solution of sodium perborate before intermixing it with the bulk, or the bulk will immediately "set up." In this mixture the amount of perborate to the plaster will vary from 10% to 20% of the mass. This plaster of Paris filler gives to the final product a rubbery feel, and is particularly desirable for rug and carpet backing to assist in locking in the pile and as a non-slip surface.

What is claimed is:

1. A rubber compound composed of an aqueous dispersion of rubber 40 to 80%; sodium bisulphite 2 to 5%; sodium perborate 2 to 5%; and water sufficient to dissolve the sodium salts.

2. A rubber compound composed of an aqueous dispersion of rubber, 40 to 80%; sodium bisulphite 2 to 5%; a compound from the group consisting of sodium carbonate and sodium perborate, 2 to 5%, and water to dissolve the sodium compounds.

DAVID PELTON MOORE.